United States Patent
Benson, Jr.

[15] 3,636,909
[45] Jan. 25, 1972

[54] MARINE POWER TRANSMISSION

[72] Inventor: Carl I. Benson, Jr., Westwood, Mass.
[73] Assignee: Paragon Gears Incorporated, Taunton, Mass.
[22] Filed: Oct. 7, 1970
[21] Appl. No.: 78,850

[52] U.S. Cl. ................................115/34 R, 64/17, 74/421, 74/606
[51] Int. Cl. .........................................B63h 23/06
[58] Field of Search ..................115/34, 35; 74/421, 606; 64/17, 18

[56] References Cited

UNITED STATES PATENTS 3,505,894  4/1970  Halibrand..........................115/34 R X
3,520,205  7/1970  Halibrand..........................115/34 R X Primary Examiner—Milton Buchler
Assistant Examiner—Carl A. Rutledge
Attorney—James E. Nilles

[57] ABSTRACT

A power transmission including universal joints for transmitting power between two shafts which are inclined to one another, such as between the shaft of the engine and the propeller shaft which extends at an angle from the engine shaft. The transmission includes a gear housing having an angled housing in which one of the universal joints is rotatably journaled and also includes another universal joint located outside of the angled housing. The universal joint which is located within the angled housing accommodates approximately one-half the angle between the engine shaft centerline and the propeller shaft centerline. The second universal joint located externally of the housing accommodates the remaining angular displacement between the shafts and serves another function of acting as a flexible joint to compensate for small additional angular misalignment between the engine and the propeller shafts which may occur due to manufacturing and installation tolerances, hull deflections, flexible engine mounts, etc.

A lubricating means including an impeller driven by the universal joint is located within the angular housing, which impeller forces oil through a conduit and to an antifriction bearing assembly to assure a flow of oil through the assembly and also good circulation in other parts of the transmission.

10 Claims, 6 Drawing Figures

PATENTED JAN 25 1972
3,636,909
SHEET 1 OF 2
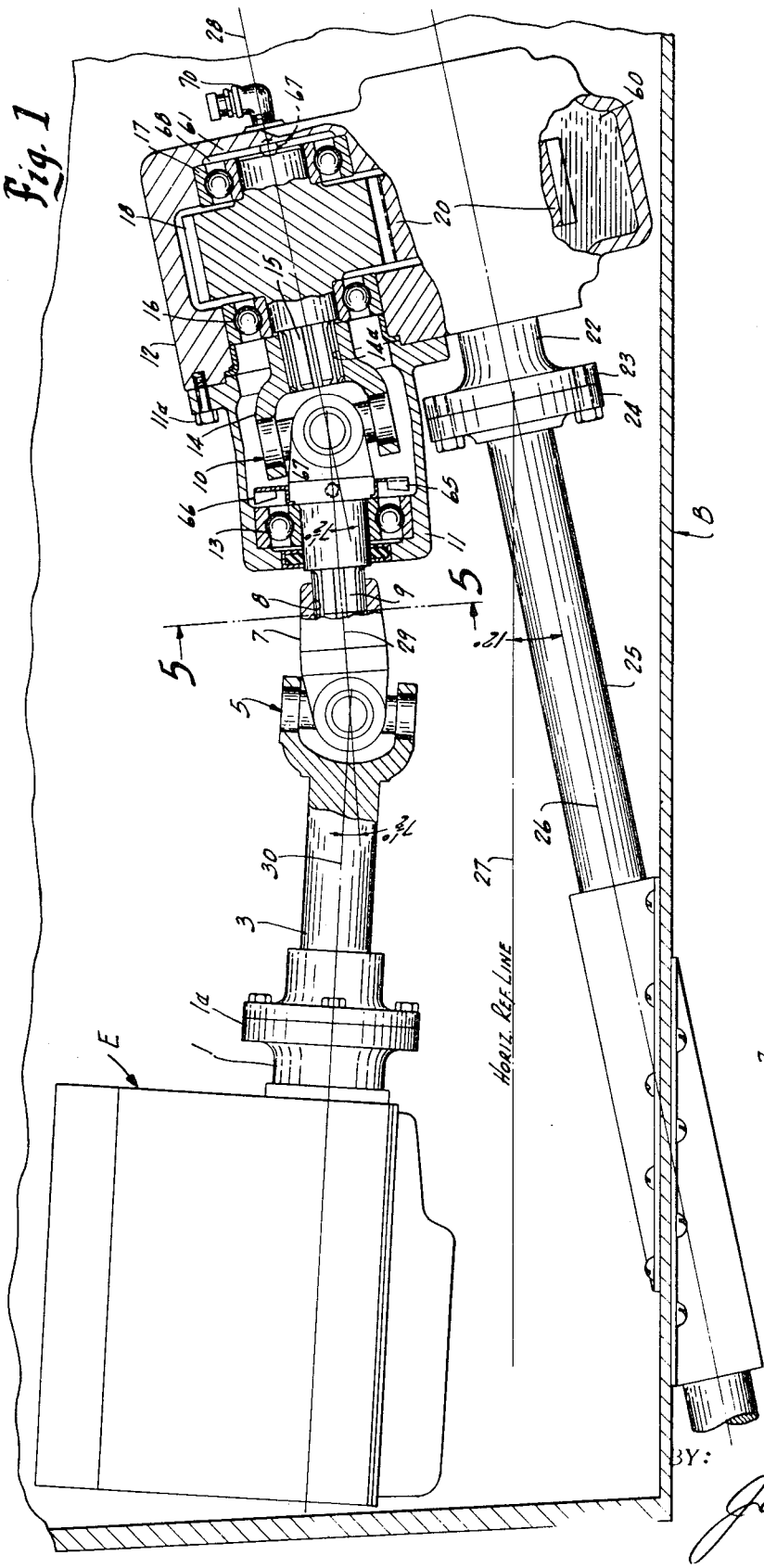
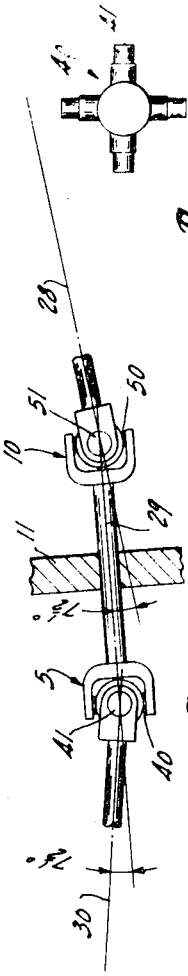
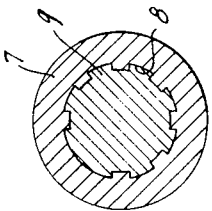
INVENTOR:
CARL I. BENSON, Jr.
BY: James E. Nilles
ATTORNEY

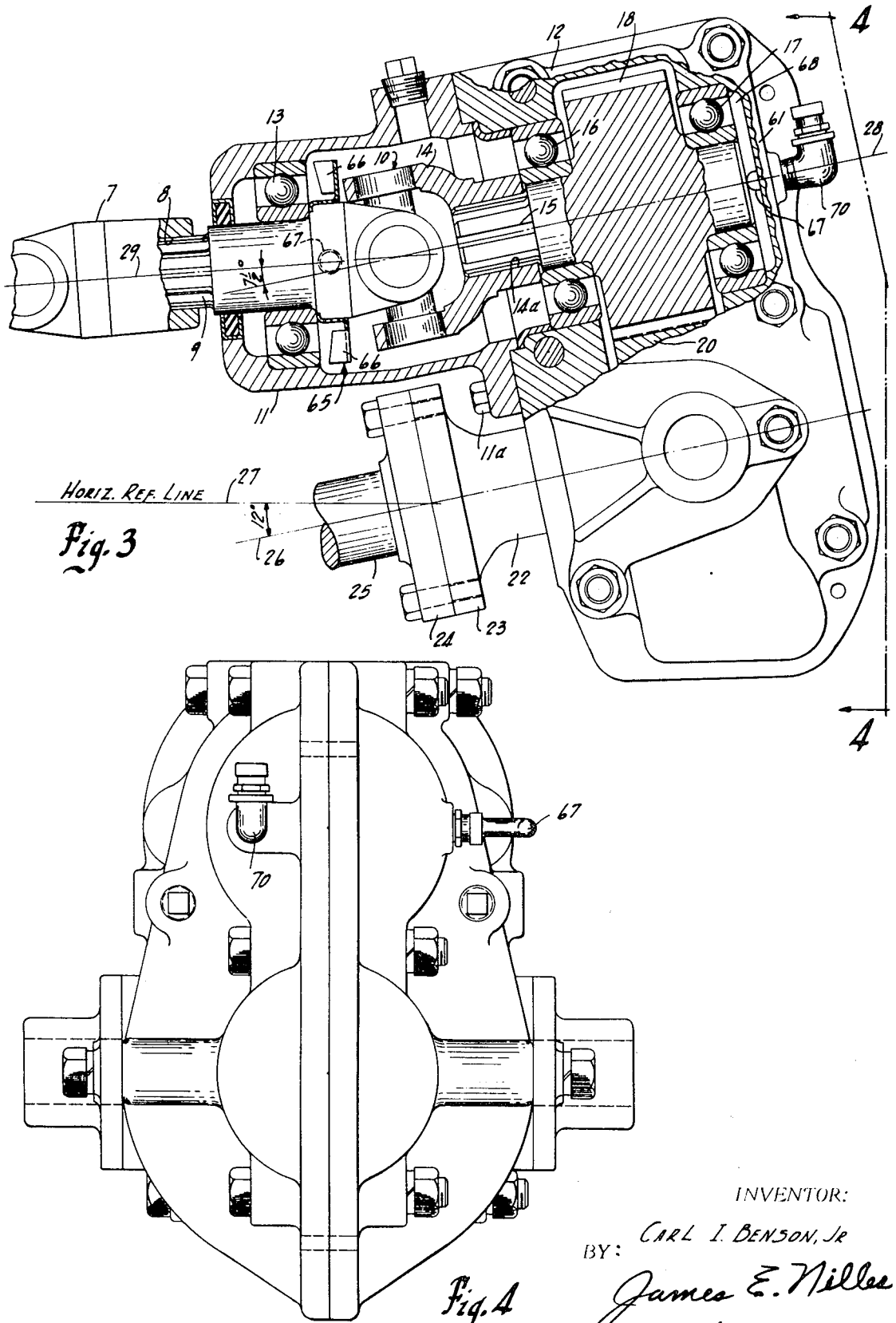

MARINE POWER TRANSMISSION

BACKGROUND OF THE INVENTION

The invention pertains generally to transmissions for transmitting power between two angularly disposed shafts, such as found in Marine V-drives wherein the propeller shaft is inclined to the engine shaft. Various prior art devices have been proposed and which utilize universal joints for accommodating the misalignment between the shafts.

An example of the prior art is shown in the U.S. Pat No. 2,859,634, issued on Nov. 11, 1958 to G. Walter and entitled "Marine V-Drive." While such an arrangement did operate satisfactorily, it nevertheless was costly to manufacture because of the numerous parts required. Furthermore, the drive itself did not provide sufficient flexibility in addition to the known and predetermined amount of angular displacement, between the shafts and between the engine and the ship hull, and consequently additional equipment, such as flexible couplings, were required.

SUMMARY OF THE INVENTION

The present invention provides a marine V-drive power transmission including a gear box and which also has an angular housing attached to the gear box for the enclosure of one universal joint. Another universal joint is located exteriorly of the angled housing, is connected with the first universal joint and is located between the engine and the first universal joint. This second universal joint which is located outside the angular housing functions not only to accommodate approximately one-half of the angular displacement between the engine shaft and the propeller shaft, but it functions to provide additional limited angular flexibility, thereby making it unnecessary to utilize a flexible coupling elsewhere in the transmission. This additional angular flexibility provided by the second, externally located joint, is necessary in order to accommodate variations in the relative positions of the engine and V-drive, which variations occur from manufacturing, installation, and operational tolerances, which are found in the various parts and also which are occasioned by the hull deflections, flexible engine mounts, etc.

Each of the two universal joints of the present transmission accommodate approximately one-half of the angular displacement between the engine and propeller shafts, and furthermore the circumferential angular alignment between the joint crosses is maintained, thereby resulting in both constant input and output of the transmission. That is to say, the aligned relationship between crosses 40 and 50 in maintained, resulting in constant output speed at gear 18.

The present invention provides a particularly compact, economically produced, and flexible V-drive transmission.

Another aspect of the present invention relates to the provision of a slip joint between the universal joints and located exteriorly of the angled housing which slip joint provides a certain amount of relative axial motion to occur.

Another aspect of the invention relates to lubrication means, including an impeller driven by the universal joint within the angled housing, which provides a positive flow of lubricating and cooling oil to various parts of the transmission.

These and other objects and advantages of the present invention will appear hereinafter as this disclosure progresses, reference being had to the accompanying drawings.

BRIEF DESCRIPTION OF THE DRAWINGS

FIG. 1 is a longitudinal cross-sectional view through a V-drive transmission made in accordance with the present invention;

FIG. 2 is a perspective, schematic view of the angular relationship between the exterior and interior universal joints;

FIG. 3 is a view similar to a portion of the device shown in FIG. 1, but on an enlarged scale;

FIG. 4 is a front view of the device shown in FIG. 3, the view being taken generally along the line 4—4 in FIG. 3;

FIG. 5 is a cross-sectional view on an enlarged scale taken along line 5—5 in FIG. 1; and FIG. 6 is a transverse view showing one of the crosses of a universal joint.

DESCRIPTION OF A PREFERRED EMBODIMENT

The V-drive, marine transmission provided by the present invention is shown as being mounted within the hull of a boat B which includes a source of power such as an internal combustion engine E. The engine power output shaft 1 extends generally forwardly in the boat and has a coupling 1a fixed adjacent its rear end. A drive shaft 3 is coupled to the engine shaft and has a universal joint 5 fixed adjacent its forward end. The sleeve portion 7 of the universal joint 5 has an interior splined sleeve portion 8 in which is slideably mounted the complementary and exterior splined portion 9 of another universal joint 10.

Portion 9 extends outwardly of an angled housing 11 which is removably fixed to a gear casing 12 by the externally accessible bolt means 11a. More specifically, the portion 9 is journaled by antifriction bearing assembly 13 and extends externally from the housing 11. The interior portion of the universal joint 10 includes a yoke 14 which has a spline connection 14a with a shaft 15 that is mounted in antifriction bearing assemblies 16 and 17 within the housing 12. A pinion gear 18 is fixed to shaft 15 and acts to transmit power to a constant mesh gear 20 also journaled in the housing 12. A gear housing output shaft 22 is fixed to gear 20 and terminates in a coupling member 23 to which is fastened the complementary coupling member 24 of the propeller shaft 25.

It will be noted that the propeller shaft center 26 is, for example at an angle of about 12 degrees from the horizontal reference line 27. It will also be noted that the angle between the centerline 28 of the yoke 14 and the center line 29 of the angle housing and portion 9 of the universal joint 10, is in the neighborhood of 7½ degrees, as indicated. Furthermore, the angle between the centerline 30 of the engine output shaft 1 and the center line 29 of the sleeve portion 7 of the universal joint 5 and consequently portion 9 is, for example, in the nature of about 7½ degrees.

The angle between the angled housing 11 and the centerline of shaft 15 is therefore about 7½ degrees. Thus, the first universal joint 5 accommodates approximately half of the angular displacement between the engine crankshaft and the propeller shaft, while the other universal joint 10 accommodates the other half of the angular displacement between the engine and the propeller shafts.

The spline connection between sleeve 7 of the first universal joint 5 and the shaft portion 9 of the second universal joint 10 provides for a certain amount of axial displacement between the universal joints, or more importantly, between the engine and the gear box 12.

By having the universal joint 5 located outside the angle housing 11 it permits an additional amount of angular flexibility, thereby eliminating the necessity of other flexible couplings in the power transmission. This additional angular flexibility is required to accommodate the unpredictable variations in relative positions of the engine and V-drive which are due to installation differences and also due to shifting in the structure because of hull deflections, flexible engine mounts, and other variables.

The rotational speed delivered by the engine is constant, that is to say the input speed or angular velocity to the transmission should be constant, and furthermore it is essential that the output speed of the transmission should be constant, that is, the speed transmitted by gear 18. If only one universal joint is employed to accommodate an angular disposition of shafts in a transmission, even though the input speed were constant, the output speed would not be constant due to alternately speeding up and slowing down of the swinging end of the joint during each of its revolutions. With the use of two universal joints as in the present invention, where each joint accommodates approximately one-half of the total angular displacement between the shaft, and by furthermore maintaining a constant and aligned relationship between the crosses 40 and 50 (FIG. 2) of joints 5 and 10, respectively, constant output speed at gear 18 is assured if the input speed at shaft 3 is constant.

In order to insure that an aligned angular relationship is maintained between the crosses 40 and 50, the spline connection between portions 8 and 9 can only be made in one position. This is accomplished, for example, by having one missing spline tooth in the connection thereby insuring continued circumferential alignment between shafts 41 and 51 of crosses 40 and 50, respectively. That is to say, the crosses 40 and 50 are always in rotational phase with one another, whereby the rotational speed fluctuation of one joint is compensated for or balanced out by the rotational speed fluctuation of the other joint. Consequently, the constant input speed of the transmission is transmitted as a constant output speed.

The V-drive transmission provided by the present invention eliminates a substantial number of parts found in other transmissions and results in an economically produced transmission as well as one which is extremely efficient in performing the function for which it is designed.

As will now be described, lubricating and cooling means are provided for the transmission which insures a positive flow of oil through the parts and particularly through the antifriction bearing assembly in the housing which would otherwise not be properly lubricated and cooled.

A sufficient supply of oil 60 is located in the bottom of the housing 12 so that it is carried and splashed about in the housing by rotation of the gears 18 and 20. This oil flows through bearing assembly 16 and into the angled housing 11 to also lubricate the joint 10 and bearing assembly 13. However, the bearing assembly 17 is relatively closed, at its side adjacent the housing front wall 61 which precludes proper flow of oil through the assembly 17.

A slinger or impeller 65 is fixed to one of the yokes of joint 10 for rotation therewith. The slinger or impeller 65 may have a plurality of blades 66, and acts as a pump to throw oil as the joint rotates. A conduit 67 places the rear of the interior of housing 11 in communication with a chamber 68 in the front end of housing 12. The rear end of conduit 67 enters housing 11 adjacent the impeller 65 so as to receive oil thrown by the impeller. In effect, oil is pumped through conduit 67 and to chamber 68, and the oil then positively flows through the bearing assembly 17 for contact and distribution again by gears 18 and 20. A breather 70 is also provided for the housing.

I claim:

1. A marine power transmission for use with a boat having an engine mounted therein, said engine having an output shaft, said boat also having a propeller shaft inclined at an angle to said engine output shaft, said transmission comprising; a gear housing including meshing gears therein, an angled housing secured to said gear housing and extending generally toward said engine output shaft, a universal joint rotatably mounted in said angled housing and having a portion extending outwardly therefrom and towards said engine output shaft, a second universal joint located outside of said angled housing and having a connection with said outwardly extending portion and also connected with said engine output shaft; and a gear housing output shaft extending outwardly from said gear housing and having means for connection to said inclined propeller shaft.

2. The transmission set forth in claim 1 further characterized in that said connection between said second universal joint and said outwardly extending portion comprises a splined connection located outside of said angled housing for providing axial displacement between said universal joints.

3. The transmission described in claim 1 including externally accessible means for removably securing said angled housing to said gear housing.

4. The transmission described in claim 2 including externally accessible means for removably securing said angled housing to said gear housing.

5. The transmission set forth in claim 1 further characterized in that each universal joint accommodates approximately one-half of the angular displacement between said engine output shaft and said propeller shaft, each joint includes a cross having a pair of yokes pivoted thereto, and means for maintaining said crosses in circumferential angular alignment with one another.

6. The transmission as claimed in claim 1 including an impeller mounted on said joint located in said angled housing, a conduit placing the interior of said angled housing in communication with the interior of said gear housing said impeller located adjacent said conduit for delivering oil thereto for conveyance to said gear housing.

7. A marine power transmission for use with a boat having an engine mounted therein, said engine having an output shaft, said boat also having a propeller shaft inclined at an angle to said engine output shaft, said transmission comprising; a gear housing including meshing gears therein, an angled housing secured to said gear housing and extending generally toward said engine output shaft, a universal joint rotatably mounted in said angled housing, an impeller mounted on said joint located in said angled housing, and a conduit placing the interior of said angled housing in communication with the interior of said gear housing, said impeller located adjacent said conduit for delivering oil thereto for conveyance to said gear housing.

8. A transmission as described in claim 7 further characterized in that said universal joint is mounted in said angled housing having a portion extending outwardly of said angled housing and towards said engine output shaft, a second universal joint located outside of said angled housing and having connections with said outwardly extending portion and also connected with said engine output shaft; a gear housing output shaft extending outwardly from said gear housing and having means for connection to said inclined propeller shaft, each of said universal joints being positioned to accommodate approximately one-half of the angular displacement between said engine output shaft and said propeller shaft, each joint including a cross having a pair of yokes pivoted thereto and means for maintaining said crosses in circumferential angular alignment with one another.

9. A marine power transmission for use with a boat having an engine mounted therein, said engine having an output shaft, said boat also having a propeller shaft inclined at an angle to said engine output shaft, said transmission comprising; a gear housing including meshing gears therein, an angled housing secured to said gear housing and extending generally toward said engine output shaft, a universal joint rotatably mounted in said angled housing and having a portion extending outwardly therefrom and towards said engine output shaft, a second universal joint located outside of said angled housing, a splined connection located outside of said angled housing and connecting said outwardly extending portion with said engine output shaft to provide axial displacement between said universal joints; each universal joint being positioned so that it accommodates approximately one-half of the angular displacement between said engine output shaft and said propeller shaft, each joint including a cross having a pair of yokes pivoted thereto, and means for maintaining said crosses in circumferential angular alignment with one another, and a gear housing output shaft extending outwardly from said gear housing and having means for connection to said inclined propeller shaft.

10. The transmission as claimed in claim 9 including an impeller mounted on said joint located in said angled housing, a conduit placing the interior of said angled housing in communication with the interior of said gear housing, said impeller located adjacent said conduit for delivering oil thereto for conveyance to said gear housing.

* * * * *